(12) United States Patent
Kozakai et al.

(10) Patent No.: US 7,364,797 B2
(45) Date of Patent: Apr. 29, 2008

(54) ADHESIVE COMPOSITION AND ADHESIVE FILM

(75) Inventors: Shouhei Kozakai, Gunma-ken (JP); Nobuhiro Ichiroku, Gunma-ken (JP); Akio Suzuki, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 45 days.

(21) Appl. No.: 10/942,077

(22) Filed: Sep. 16, 2004

(65) Prior Publication Data

US 2005/0065296 A1     Mar. 24, 2005

(30) Foreign Application Priority Data

Sep. 19, 2003    (JP) .............................. 2003-327487

(51) Int. Cl.
*B32B 9/04* (2006.01)
*C08G 77/455* (2006.01)

(52) U.S. Cl. ........................ 428/447; 528/26; 528/38; 525/473; 428/413; 428/450; 428/473.5; 428/480; 428/500

(58) Field of Classification Search ..................... None
See application file for complete search history.

(56) References Cited

U.S. PATENT DOCUMENTS 5,180,627 A * 1/1993 Inoue et al. ................ 428/214
5,677,393 A * 10/1997 Ohmori et al. .............. 525/423
5,773,561 A * 6/1998 Sachdev et al. ............. 528/353
6,645,632 B2 * 11/2003 Honda et al. ............... 428/413
6,949,619 B2 * 9/2005 Ichiroku et al. ............ 528/353

FOREIGN PATENT DOCUMENTS

| JP | 5-9254 A | 1/1983 |
| JP | 4-264003 A | 9/1992 |
| JP | 7-224259 A | 8/1995 |
| JP | 8-27427 A | 1/1996 |
| JP | 10-60111 A | 3/1998 |

\* cited by examiner

*Primary Examiner*—Marc S. Zimmer
(74) *Attorney, Agent, or Firm*—Birch, Stewart, Kolasch & Birch, LLP (57) ABSTRACT

An adhesive composition is provided comprising (A) a polyimide resin containing a diorganopolysiloxane linkage having vinyl groups as organic substituent groups on the backbone, (B) an epoxy resin, and (C) an epoxy resin-curing catalyst. An adhesive film prepared from the adhesive composition has a high bond strength to various substrates and to encapsulating resins when thermocompression bonded and heat cured thereto, and possesses a low modulus of elasticity and high heat resistance, ensuring manufacture of resin packaged semiconductor devices with high reliability.

7 Claims, 1 Drawing Sheet

FIG.1

ADHESIVE COMPOSITION AND ADHESIVE FILM

CROSS-REFERENCE TO RELATED APPLICATION

This non-provisional application claims priority under 35 U.S.C. §119(a) on Patent Application No. 2003-327487 filed in Japan on Sep. 19, 2003, the entire contents of which are hereby incorporated by reference.

FIELD OF THE INVENTION

This invention relates to adhesive compositions for use in the manufacture of semiconductor devices, and more particularly, to adhesive compositions having a high bond strength and a low modulus of elasticity suited for resin molded semiconductor packages, and adhesive films using the same.

BACKGROUND OF THE INVENTION

Semiconductor devices are generally manufactured by furnishing a large diameter silicon wafer having IC circuits formed therein, dicing the wafer into semiconductor chips, bonding and securing under heat and pressure the semiconductor chip to a lead frame using a curable liquid adhesive or die bonding resin for mounting purpose, and wire bonding to electrodes, followed by encapsulation for handling and protection from the surrounding environment. Such encapsulation forms include hermetic packages such as metallic packages and ceramic packages, and non-hermetic packages using resins. At present, the latter packages based on resins, especially by transfer molding technique, are most common because of mass scale productivity and low costs. Despite such benefits, the resin molded packages are undesirably poor in moisture resistance, heat resistance, thermal stress relaxation and heat release.

In concert with the current demand for electric and electronic equipment of smaller size and more multi-functions, the interconnection technology of semiconductor devices seeks for a higher density and further miniaturization. Since semiconductor chips are increased in size, and semiconductor devices often take a chip scale package (CSP) structure having the same size as area array junction type chips free of lead frames or a chip stacked structure (stacked CSP or SiP), the packaging process poses more harsh thermal impacts or stresses.

The subsequent process of installing or mounting such semiconductor devices on printed circuit boards also imposes strict requirements as demonstrated by the reflow resistance enough to accommodate lead-free solders that reaches a high temperature of 265° C. There exists an increasing need for a material having optimum and high functions. Among package constituent materials, in particular, the die bonding resin has properties controllable over a relatively wide range and can be readily tailored to meet such requirements. Thus, a material having a high bond strength, a low modulus of elasticity and high heat resistance enough to withstand harsh thermal impacts or stresses is needed as the die bonding resin.

Miniaturization is also imposed on support substrates on which semiconductor chips are installed. The use of liquid adhesive has problems including contamination of electrodes with the adhesive which is squeezed out of the chip edge upon mounting of a semiconductor chip, and failure of wire bonding due to chip tilt caused by uneven thickness of an adhesive layer. There is a desire to have adhesive films that overcome these problems.

In the prior art, low modulus materials having siloxane structures incorporated into polyimides and polyamide-imides which are heat resistant resins were developed as the desired adhesive. For example, JP-A 5-009254 and JP-A 4-264003 disclose siloxane-modified polyamide-imides, which are less adherent to substrates.

JP-A 10-060111 discloses to combine a siloxane-modified polyamide-imide with a compound having at least two maleimide groups for improving high-temperature properties. This resin composition is less adherent.

JP-A 7-224259 and JP-A 8-027427 disclose heat resistant adhesive films comprising a polyimide silicone and an epoxy resin, having excellent adhesion, a low modulus of elasticity and heat resistance. In the course of packaging process, the bond of encapsulating resin to a die bonding adhesive layer after adhesive layer curing is very low.

SUMMARY OF THE INVENTION

An object of the present invention is to provide an adhesive composition which cures into a product having improved adhesion, heat resistance, and a low modulus of elasticity, and an adhesive film using the same.

Addressing an adhesive composition comprising a polyimide resin, an epoxy resin and an epoxy resin-curing catalyst, the inventor has found that use of a polyimide resin containing a diorganopolysiloxane linkage having vinyl groups as organic substituent groups on the backbone ensures that the adhesive composition cures into a product having a high bond strength, a low modulus of elasticity and high heat resistance.

Accordingly, the present invention provides an adhesive composition comprising as essential components,
  (A) a polyimide resin containing a diorganopolysiloxane linkage having vinyl groups as organic substituent groups on the backbone,
  (B) an epoxy resin, and
  (C) an epoxy resin-curing catalyst.

An adhesive film using the adhesive composition is also contemplated.

The adhesive film prepared from the adhesive composition of the invention has a high bond strength to various substrates and to encapsulating resins when thermocompression bonded and heat cured thereto, and possesses a low modulus of elasticity and high heat resistance. Using the adhesive film, resin packaged semiconductor devices of high reliability can be manufactured.

BRIEF DESCRIPTION OF THE DRAWING

The only FIGURE.

DETAILED DESCRIPTION OF THE INVENTION

The adhesive composition of the invention contains as essential components, (A) a polyimide resin containing a diorganopolysiloxane linkage having vinyl groups as organic substituent groups on the backbone, (B) an epoxy resin, and (C) an epoxy resin-curing catalyst. The composition maintains its shape at normal temperature and forms a thin coating or film. When heated, the film cures to any substrate while passing through a plastic state. The cured film exhibits good adhesion to the substrate, a low elasticity, and a high bond strength to an encapsulating resin.

For the polyimide resin containing a diorganopolysiloxane linkage having vinyl groups as organic substituent groups on the backbone, serving as component (A), use may be made of polyamic acid resins having the following general formula (3) which are polyimide precursors, and polyimide resins having the following general formula (4).

(3)

(4)

In formulae (3) and (4), X is a tetravalent organic group containing an aromatic or aliphatic ring, Y is a divalent organic group, and q is an integer of 1 to 300.

The polyamic acid resin can be imidized (dehydrating ring-closure) during the heat curing involved in the die bonding step, forming water as by-product which can cause separation or failure at the bonding interface. For this reason, the polyimide resin of formula (4) which has been already imidized (dehydrating ring-closure) is preferred. The polyimide resin should contain a diorganopolysiloxane linkage having vinyl groups as organic substituent groups on the backbone, and should preferably have phenolic hydroxyl groups within its skeleton as long as adhesion is concerned.

In formula (3), q is an integer of 1 to 300, preferably 2 to 300, more preferably 5 to 300. A polyamic acid resin having such a repeating number can be readily prepared by the following method. Understandably, the polyimide resin of formula (4) can be prepared by subjecting the polyamic acid resin of formula (3) to dehydration and ring-closure in a conventional manner.

The polyamic acid resin of formula (3) can be prepared by reacting approximately equimolar amounts of a tetracarboxylic acid dianhydride of the structural formula (5):

(5)

wherein X is as defined above and a diamine of the structural formula (6):

$H_2N-Y-NH_2$     (6)

wherein Y is as defined above in an organic solvent in a conventional manner.

Illustrative, non-limiting examples of suitable tetracarboxylic acid dianhydrides of formula (5) are given below.

These tetracarboxylic acid dianhydrides of formula (5) may be used alone or in admixture of any.

It is preferred for solubility in organic solvents, adhesion to substrates, low elasticity and flexibility that the diamine of formula (6) comprise a diaminosiloxane of the structural formula (1), preferably in an amount of 1 to 80 mol %, more preferably 1 to 60 mol %. For adhesion to encapsulating resins, the diaminosiloxane is preferably one in which vinyl groups account for at least 5 mol %, especially at least 10 mol % of entire organic substituent groups bonded to silicon atoms.

(1)

Herein $R^1$ is a divalent organic group of 3 to 9 carbon atoms, $R^2$ to $R^6$ each are a substituted or unsubstituted monovalent hydrocarbon group of 1 to 8 carbon atom, exclusive of vinyl, n is 0 or an integer of at least 1, m is an integer of at least 1, and the sum of n+m is an integer of 1 to 100.

In the siloxanediamines or α,ω-diaminopolysiloxanes represented by formula (1), suitable divalent organic groups of 3 to 9 carbon atoms represented by $R^1$ include divalent hydrocarbon groups which may contain an ether oxygen atom, for example, alkylene groups such as —(CH$_2$)$_3$—, —(CH$_2$)$_4$—, —CH$_2$CH(CH$_3$)—, —(CH$_2$)$_6$— and —(CH$_2$)$_8$—; arylene groups such as alkylene-arylene groups which are combinations of the foregoing groups; oxyalkylene groups such as —(CH$_2$)$_3$—O— and —(CH$_2$)$_4$—O—; oxyarylene groups such as and oxyalkylene-arylene groups which are combinations of the foregoing groups, such as

Suitable substituted or unsubstituted monovalent hydrocarbon groups of 1 to 8 carbon atom, represented by $R^2$ to $R^6$ include alkyl groups such as methyl, ethyl, propyl, isopropyl, butyl, isobutyl, tert-butyl, hexyl, cyclohexyl, 2-ethylhexyl and octyl; alkenyl groups such as allyl, propenyl, isopropenyl, butenyl, isobutenyl and hexenyl; aryl groups such as phenyl, tolyl and xylyl; aralkyl groups such as benzyl and phenylethyl; and halogenated monovalent hydrocarbon groups in which some or all of the hydrogens bonded to carbon atoms on the foregoing hydrocarbon groups have been substituted with halogen atoms such as fluorine, bromine or chlorine, for example, haloalkyl groups such as chloromethyl, bromoethyl and 3,3,3-trifluoropropyl. Of these, methyl and phenyl are preferred.

The diaminosiloxanes of formula (1) may be used alone or in admixture of any.

The diamines of formula (6) other than the diaminosiloxanes of formula (1) include aromatic ring-bearing diamines such as p-phenylenediamine, m-phenylenediamine, 4,4'-diaminodiphenylmethane, 4,4'-diaminodiphenyl ether, 2,2'-bis(4-aminophenyl)propane, 4,4'-diaminodiphenylsulfone, 4,4'-diaminodiphenylsulfide, 1,4-bis(3-aminophenoxy)benzene, 1,4-bis(4-aminophenoxy)benzene, 1,4-bis(p-aminophenylsulfonyl)benzene, 1,4-bis(m-aminophenylsulfonyl)benzene, 1,4-bis(p-aminophenylthioether)benzene, 1,4-bis(m-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, bis[4-(4-aminophenoxy)phenyl]sulfone, and 2,2-bis[4-(4-aminophenoxy)phenyl]perfluoropropane. Of these, preferred are p-phenylenediamine, m-phenylenediamine, 4,4'-diaminodiphenylmethane, 4,4'-diaminodiphenyl ether, 1,4-bis(3-aminophenoxy)benzene, 1,4-bis(4-aminophenoxy)benzene, 2,2-bis[4-(4-aminophenoxy)phenyl]propane, and 2,2-bis[3-methyl-4-(4-aminophenoxy)phenyl]propane.

It is preferred for adhesion that the polyimide resin have phenolic hydroxyl groups on its polymer skeleton. Incorporation of phenolic hydroxyl groups may be achieved using a diamine compound having a phenolic hydroxyl group which is highly reactive with epoxy groups. Such diamine compounds include those of the following structure.

Herein, $R^7$ is independently selected from hydrogen, halogen atoms (e.g., fluorine, bromine and iodine), and substituted or unsubstituted monovalent hydrocarbon groups of 1 to 8 carbon atoms such as alkyl, alkenyl, alkynyl, trifluoromethyl and phenyl. All the substituent groups on each aromatic ring may be the same or different. The subscript n is an integer of 0 to 5. A and B each may be one type or a mixture of two or more. R is selected from hydrogen, halogen atoms, and substituted or unsubstituted monovalent hydrocarbon groups.

Suitable substituted or unsubstituted monovalent $C_1$-$C_8$ hydrocarbon groups represented by $R^7$ include those exemplified above for $R^2$ to $R^6$, as well as alkynyl groups such as ethynyl, propynyl, butynyl, and hexynyl. Suitable substituted or unsubstituted monovalent hydrocarbon groups represented by R include those exemplified above for $R^7$.

Of the phenolic hydroxyl group-containing diamine compounds, those diamine compounds of the following formula (2) are especially preferred.

(2)

Herein, $R^7$ is as defined above.

The phenolic hydroxyl group-containing diamine compound is preferably used in an amount of 5 to 60% by weight, more preferably 10 to 40% by weight based on the total weight of diamine compounds. Outside the range, less amounts of the phenolic hydroxyl group-containing diamine compound may lead to a lower bond strength whereas too much amounts may detract from the flexibility of the adhesive layer.

For incorporation of phenolic hydroxyl groups, a monoamine having a phenolic hydroxyl group may be used. Its structure is exemplified below.

Herein, $R^7$ is independently selected from hydrogen, halogen atoms (e.g., fluorine, bromine and iodine), and substituted or unsubstituted monovalent hydrocarbon groups of 1 to 8 carbon atoms such as alkyl, alkenyl, alkynyl, trifluoromethyl and phenyl, examples of which are as described above. All the substituent groups on each aromatic ring may be the same or different. D may be one type or a mixture of two or more. The subscript p is an integer of 1 to 3.

When used, the monoamine having a phenolic hydroxyl group may be combined in an amount of 1 to 10 mol % based on the total of diamine compounds.

The amine compounds used herein are not limited to the foregoing. The amine compounds may be used alone or in combination of two or more.

Described below is one illustrative reaction to produce a polyamic acid resin or polyimide resin. The starting reactants, described above, are dissolved in an organic solvent in an inert atmosphere, and reaction is effected typically at a temperature below 80° C., preferably 0 to 40° C. to synthesize a polyamic acid resin. The polyamic acid resin is further heated typically at a temperature of 100 to 200° C., preferably 150 to 200° C., to induce dehydration and ring-closure to the acid amide moiety of the polyamic acid resin, thus synthesizing the target polyimide resin.

Any organic solvent may be used in the above reaction as long as it is inert to the resulting polyamic acid. Even an organic solvent in which the starting reactants are not fully dissolvable may be used. Examples include tetrahydrofuran, 1,4-dioxane, cyclopentanone, cyclohexanone, γ-butyrolactone, N-methylpyrrolidone, N,N-dimethylacetamide, N,N-dimethylformamide and dimethylsulfoxide. Of these, aprotic polar solvents are preferred, with N-methylpyrrolidone, cyclohexanone and γ-butyrolactone being most preferred. The solvents may be used alone or in admixture of any.

Desirably, an azeotropic dehydrating agent such as toluene or xylene is used to facilitate the cyclodehydration. Also, the use of an acetic anhydride/pyridine mixture permits cyclodehydration to take place at lower temperature.

It is noted that a dicarboxylic acid anhydride such as maleic anhydride or phthalic anhydride and/or aniline, n-butylamine or a phenolic hydroxyl group-containing monoamine as mentioned above may be added to adjust the molecular weight of polyamic acid and polyimide resins. The amount of dicarboxylic acid anhydride added herein is typically 0 to 2 parts by weight per 100 parts by weight of the tetracarboxylic acid dianhydride; and the amount of monoamine added is typically 0 to 2 parts by weight per 100 parts by weight of the diamine.

The epoxy resin (B) used herein is preferably a compound having at least two epoxy groups in a molecule, with no particular limits imposed on the molecular structure, molecular weight and the like. Examples include diglycidyl ethers of bis(4-hydroxyphenyl)methane, 2,2'-bis(4-hydroxyphenyl)propane or halides thereof, and polycondensation products thereof (known as bisphenol F epoxy resins and bisphenol A epoxy resins), butadiene diepoxide, vinyl cyclohexene dioxide, resorcinol diglycidyl ether, 1,4-bis(2,3-epoxypropoxy)benzene, 4,4'-bis(2,3-epoxypropoxy)diphenyl ether, 1,4-bis(2,3-epoxypropoxy)cyclohexene, bis(3,4-epoxy-6-methylcyclohexylmethyl)adipate, epoxy glycidyl ethers or polyglycidyl esters resulting from condensation of 1,2-dioxybenzene or resorcinol, polyhydric phenols, or polyhydric alcohols with epichlorohydrin, epoxy novolac resins (i.e., novolac type epoxy resins) resulting from condensation of novolac phenolic resins (or halogenated novolac phenolic resins) such as phenol novolac and cresol novolac with epichlorohydrin, epoxidized polyolefins which are epoxidized by a peroxy method, epoxidized polybutadiene, naphthalene ring-containing epoxy resins, biphenyl epoxy resins, phenol aralkyl type epoxy resins, biphenyl aralkyl type epoxy resins, and cyclopentadiene type epoxy resins.

It is acceptable to use a mono-epoxy compound in combination with the compound having at least two epoxy groups in a molecule. Suitable mono-epoxy compounds include styrene oxide, cyclohexene oxide, propylene oxide, methyl glycidyl ether, ethyl glycidyl ether, phenyl glycidyl ether, allyl glycidyl ether, octylene oxide, and dodecene oxide. The epoxy resin used herein is not limited to one type, and a mixture of two or more epoxy resins may be used.

An appropriate amount of the epoxy resin (B) compounded is 5 to 200 parts by weight, more preferably 10 to 100 parts by weight per 100 parts by weight of the polyimide resin (A). Outside the range, less amounts of the epoxy resin may lead to a lower bond strength whereas too much amounts may detract from the flexibility of the adhesive layer.

In the adhesive composition of the invention, a curing agent for the epoxy resin may be used. The curing agent may be selected from a variety of curing agents known in the art for the curing of epoxy resins. Examples include amine compounds such as diethylene triamine, triethylene tetramine, diethylaminopropylamine, N-aminoethylpiperadine, bis(4-amino-3-methylcyclohexyl)methane, m-xylylene diamine, menthane diamine, and 3,9-bis(3-aminopropyl)-2,4,8,10-tetraoxaspiro(5,5)undecane; modified aliphatic polyamines such as epoxy resin-diethylene triamine adduct, amine-ethylene oxide adduct, and cyanoethylated polyamine; phenolic resins containing at least two phenolic hydroxyl groups in a molecule, such as bisphenol A, trimethylol allyloxyphenol, phenol novolac resins with a low degree of polymerization, epoxidized or butylated phenolic resins, and phenolic resins available under the trade name of Super Beckcite 1001 (Nippon Reichhold Chemicals Co., Ltd.), Hitanol 4010 (Hitachi, Ltd.), Scado form L.9 (Scado Zwoll), and Methylon 75108 (General Electric Co.); carbon resins available under the trade name of Backamine P.138 (Nippon Reichhold Chemicals Co., Ltd.), Melan (Hitachi, Ltd.), and U-Van 10R (Toyo Koatsu Co., Ltd.); amino resins such as melamine resins and aniline resins; polysulfide resins containing at least two mercapto groups in a molecule, as represented by the formula: $HS(C_2H_4OCH_2OC_2H_4SS)_n$ $C_2H_4OCH_2OC_2H_4SH$ wherein n is an integer of 1 to 10; and organic acids or acid anhydrides such as phthalic anhydride, hexahydrophthalic anhydride, tetrahydrophthalic anhydride, pyromellitic anhydride, methylnadic acid, dodecylsuccinic anhydride, and chlorendic anhydride. Of the foregoing curing agents, phenolic resins, especially phenolic novolac resins are desired since they provide the inventive composition with good moldability, workability, and moisture resistance, and are non-toxic and relatively inexpensive. On use, the curing agents are not limited to one type, and a mixture of two or more curing agents may be used depending on their curing ability and the like.

The amount of the curing agent used varies widely with a particular type thereof. The curing agent is typically used in an amount of 1 to 100 parts by weight, preferably 5 to 50 parts by weight per 100 parts by weight of the epoxy resin. Less than 1 pbw of the curing agent may be difficult to cure the inventive composition to a full extent. More than 100 pbw of the curing agent is uneconomical, dilutes the epoxy resin so that a longer time is taken for curing, and results in a cured product having degraded physical properties.

In an embodiment wherein a polyimide resin having phenolic hydroxyl groups in a skeleton is used as component (A), the compounding ratio of epoxy resin and phenolic resin-base curing agent to polyimide resin is important. In this embodiment, curing reaction proceeds by utilizing the reaction of phenolic hydroxyl groups with epoxy groups. In this regard, less epoxy groups may provide insufficient bond strength to adherend. With excessive epoxy groups, the modulus of elasticity may increase due to the epoxy resin, which is inadequate for formation of flexible adhesive sheets. Then, the amount of epoxy resin and phenolic resin-base curing agent combined is preferably 1 to 900 parts by weight, more preferably 5 to 400 parts by weight per 100 parts by weight of the polyimide resin.

Though not critical, the chemical equivalent ratio of the total of the phenolic resin-base curing agent and the phenolic hydroxyl group-containing polyimide resin to the epoxy resin is preferably in the range of 0.7:1 to 1.3:1, more preferably 0.8:1 to 1.2:1. Outside the range, some properties may change with time.

In an embodiment wherein the epoxy resin-curing agent used is not a phenolic resin, the amounts and equivalent ratio of polyimide resin and epoxy resin may be set in the above-mentioned ranges.

In the inventive composition, an epoxy resin-curing catalyst (C) is essentially included. The curing catalyst used herein is not particularly limited and includes phosphorus base catalysts and amine base catalysts.

Suitable phosphorus base catalysts include triphenylphosphine, triphenylphosphonium triphenylborate, tetraphenylphosphonium tetraphenylborate, and compounds of the following formula.

Herein, $R^8$ to $R^{15}$ are selected from hydrogen atoms, halogen atoms such as fluorine, bromine and iodine, and unsubstituted or substituted monovalent hydrocarbon groups such as $C_{1-8}$ alkyl, alkenyl, alkynyl, $C_{1-8}$ alkoxy, trifluoromethyl, and phenyl. All the substituent groups may be the same or different.

Suitable monovalent hydrocarbon groups represented by $R^8$ to $R^{15}$ include those exemplified above for $R^7$ as well as alkoxy groups such as methoxy, ethoxy, propoxy, isopropoxy and butoxy.

Suitable amine base catalysts include imidazole derivatives such as 2-methylimidazole, 2-ethyl-4-methylimidazole, 1-cyanoethyl-2-methylimidazole, and 2-phenyl-4,5-dihydroxymethylimidazole.

The epoxy resin-curing catalysts may be used alone or in admixture of two or more. The curing catalyst may be used in a catalytic amount.

In the adhesive composition of the invention, additives including fillers such as finely divided silica, alumina, titanium oxide, carbon black and electroconductive particles, colorants such as inorganic or organic pigments and dyes, wetting agents, antioxidants and thermal stabilizers may be added if desired for a particular purpose and as long as the benefits of the invention are not impaired.

The adhesive composition of the invention may be prepared by combining the polyimide resin (A), epoxy resin (B), epoxy resin-curing catalyst (C) and optional components together and mixing them in an ordinary manner.

On use, the adhesive composition of the invention, prepared as above, may be processed in several ways. One typical procedure involves dissolving the composition in an aprotic polar solvent such as toluene, cyclohexanone or NMP in a suitable concentration, applying the resulting solution onto a substrate, drying, bonding an adherend to the coating under pressure, followed by heat curing. Alternatively, the solution of the adhesive composition in a solvent in a suitable concentration is applied onto a support and dried to produce a film having an adhesive layer formed thereon, referred to as adhesive film. The adhesive film is interposed between the support and an adherend, followed by compression bonding and heat curing. Examples of the film-forming support include polyethylene, polypropylene, polyesters, polyamides, polyimides, polyamide-imides, polyether-imides, polytetrafluoroethylene, paper, metal foil, and the like, while the support surface may be pretreated with parting agents.

Preferred drying conditions under which the adhesive composition is rendered into an adhesive layer include a temperature of room temperature to 200° C., especially 80 to 150° C. and a time of about 1 minute to about 1 hour, especially about 3 to 10 minutes.

The thickness of the adhesive layer is not particularly limited, may be selected for a particular purpose, and is preferably 10 to 100 μm, especially 15 to 50 μm. For curing, preferably the adhesive layer is press-bonded under a pressure of 0.01 to 10 MPa, especially 0.1 to 2 MPa before it is cured at a temperature of 100 to 200° C., especially 120 to 180° C. for about 30 minutes to 5 hours, especially about 1 to 2 hours.

The adhesive composition of the invention may be used not only in the manufacture of electronic parts, but also in various processes involving bonding.

EXAMPLE

Synthesis examples, examples of the invention, and comparative examples are given below by way of illustration, and are not intended to limit the scope of the invention. Herein pbw is parts by weight.

[Polyimide Resin Synthesis]

Synthesis Example 1

A 1-liter separable flask equipped with a reflux condenser with a 25-ml cocked water metering receiver, thermometer and stirrer was charged with 54.58 pbw (amine equivalent 454) of a vinylmethyldiaminopolysiloxane containing 18.2 mol % of vinyl groups based on the entire organic groups bonded to silicon atoms, represented by the formula:

and 60 pbw of 2-methylpyrrolidone as a reaction medium. With stirring, the diamine was dispersed. A solution of 44.42 pbw of 6FDA (2,2-bis(3,4-dicarboxyphenyl)hexafluoropropane) as an acid anhydride in 140 pbw of 2-methylpyrrolidone was added dropwise to the dispersion, which was stirred at room temperature for 2 hours for reaction, yielding an acid anhydride-rich amic acid oligomer.

Next, a 1-liter separable flask equipped with a reflux condenser with a 25-ml cocked water metering receiver, thermometer and stirrer was charged with 19.79 pbw of a phenolic hydroxyl group-containing aromatic diamine (Diamine 1) represented by the formula:

and 156 pbw of 2-methylpyrrolidone. With stirring, the diamine was dispersed. To the dispersion, the acid anhydride-rich amic acid oligomer prepared above was added dropwise. By stirring at room temperature for 16 hours, a polyamic acid solution was synthesized. Then, 50 ml of xylene was admitted, after which the temperature was raised, and reflux continued at about 180° C. for 2 hours. It was confirmed that an amount of water collected in the water metering receiver and effluent water output ceased, after which the xylene was stripped off at 180° C. while the effluent liquid in the receiver was discharged. Following the completion of reaction, the reaction solution was added dropwise to a large excess of methanol whereupon a polymer precipitated. The precipitate was vacuum dried, yielding a polyimide resin having phenolic hydroxyl groups in the skeleton, Polyimide Resin I.

The polyimide resin was analyzed by infrared absorption spectroscopy. An absorption peak attributable to polyamic acid indicating the presence of unreacted functional groups did not appear. Imide group absorption peaks were observed at 1780 cm$^{-1}$ and 1720 cm$^{-1}$, and an absorption peak attributable to phenolic hydroxyl group was observed at 3500 cm$^{-1}$.

Synthesis Example 2

Polyimide Resin II was synthesized as in Synthesis Example 1 aside from using 54.72 pbw (amine equivalent 456) of a vinylmethyldiaminopolysiloxane containing 9.1 mol % of vinyl groups based on the entire organic groups bonded to silicon atoms, of the structure shown in Synthesis Example 1, as the vinylmethyldiaminopolysiloxane and 357 pbw (total) of 2-methylpyrrolidone as the reaction medium.

Synthesis Example 3

Polyimide Resin III was synthesized as in Synthesis Example 1 aside from using 66.56 pbw (amine equivalent 832) of a vinylmethyldiaminopolysiloxane containing 21.43 mol % of vinyl groups based on the entire organic groups bonded to silicon atoms, of the structure shown in Synthesis Example 1, as the vinylmethyldiaminopolysiloxane and 422 pbw (total) of 2-methylpyrrolidone as the reaction medium.

Synthesis Example 4

Polyimide Resin IV was synthesized as in Synthesis Example 1 aside from using 64.8 pbw (amine equivalent 810) of a vinylmethyldiaminopolysiloxane containing 5.95 mol % of vinyl groups based on the entire organic groups bonded to silicon atoms, of the structure shown in Synthesis Example 1, as the vinylmethyldiaminopolysiloxane and 417 pbw (total) of 2-methylpyrrolidone as the reaction medium.

Synthesis Example 5

Polyimide Resin V was synthesized as in Synthesis Example 1 aside from using 16.4 pbw of 2,2-bis(4-(4-aminophenoxy)phenyl)propane instead of the phenolic hydroxyl group-containing aromatic diamine (Diamine 1), and 346 pbw (total) of 2-methylpyrrolidone as the reaction medium.

Synthesis Example 6

Polyimide Resin VI was synthesized as in Synthesis Example 1 aside from using 53.04 pbw (amine equivalent 442) of a vinylmethyldiaminopolysiloxane containing 4.55 mol % of vinyl groups based on the entire organic groups bonded to silicon atoms, of the structure shown in Synthesis Example 1, as the vinylmethyldiaminopolysiloxane and 352 pbw (total) of 2-methylpyrrolidone as the reaction medium.

Synthesis Example 7

Polyimide Resin VII was synthesized as in Synthesis Example 1 aside from using 51.8 pbw (amine equivalent 432) of a vinyl-free diaminosiloxane of the structure shown below as the diaminosiloxane and 348 pbw (total) of 2-methylpyrrolidone as the reaction medium.

Examples 1-8 and Comparative Example 1

Each of Polyimide Resins I to VII in Synthesis Examples 1 to 7, 50 pbw, was dissolved in 50 pbw of cyclohexanone. This solution was combined and mixed with a liquid epoxy resin RE310S or RE600NM (Nippon Kayaku Co., Ltd.) and an imidazole base curing catalyst 2PHZ (Shikoku Chemicals Co., Ltd.) in accordance with the recipe shown in Table 1, obtaining Adhesive Compositions I to IX.

Each adhesive composition was applied onto a PET film of 50 μm thick having a fluorosilicone parting agent coated thereon, and heat dried at 80° C. for 30 minutes to form an adhesive layer of about 50 μm thick, yielding an adhesive film. Adhesive Films I to IX correspond to Adhesive Compositions I to IX.

Adhesive Films I to IX were tested. The cured adhesive films were evaluated for several properties (Young's modulus, adhesion of encapsulating resin to cured adhesive resin, adhesion to silver substrate, and adhesion after hot humid holding) by the following methods. The results are also shown in Table 1.

Young's Modulus

The adhesive film was cured by heat treatment at 175° C. for one hour. The cured adhesive film of 20 mm×5 mm×50 μm (thick) was measured for dynamic viscoelasticity. Using a dynamic viscoelasticity meter, Young's modulus was measured in the tensile mode under conditions: a chuck-to-chuck distance of 15 mm, a temperature of 25° C., and a frequency of 30 Hz.

Adhesion of Encapsulating Resin to Cured Adhesive

Figure 1:
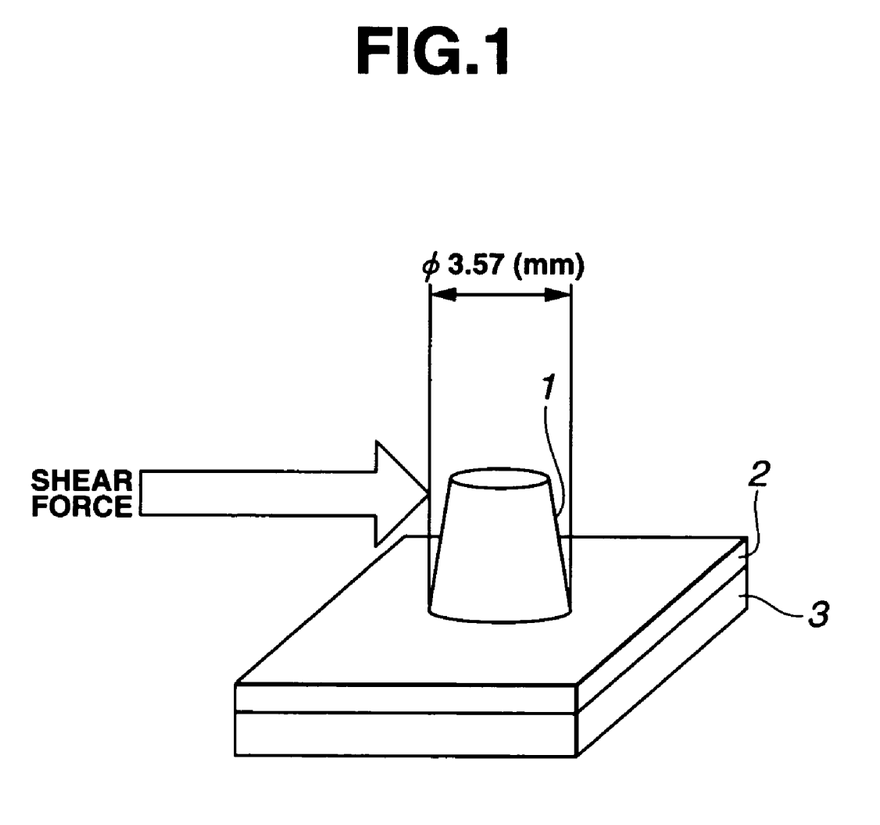
FIG. 1 is a perspective view of a resin/adhesive/copper plate assembly for measuring the bond strength between adhesive and encapsulating resin.

The adhesive layer side of the adhesive film was bonded to a copper plate of 18 mm×18 mm by thermal compression at 80° C. and 0.01 MPa for 10 seconds. Subsequent heat treatment at 175° C. for one hour caused the heat resistant resin layer to cure. The PET film was peeled off. Using a transfer molding machine, an encapsulating resin KMC-2520VA-1 (Shin-Etsu Chemical Co., Ltd.) was molded at 175° C. in a frustoconical shape on the adhesive layer surface. As shown in FIG. 1, the frustoconical block 1 of encapsulating resin having a bottom diameter of 3.57 mm is secured to the adhesive layer 2 on the copper plate 3. Subsequent heat treatment at 175° C. for one hour caused the encapsulating resin to cure. Using a bond tester (by Dage), the shear bond strength between the encapsulating resin and the adhesive was measured.

Adhesion to Ag Substrate

The adhesive film was cut into a piece of 5 mm×5 mm. The adhesive layer side of the piece was bonded to a silver-plated copper plate of 18 mm×18 mm by thermal compression at 80° C. and 0.01 MPa for 10 seconds. The PET film was peeled off. Another silver-plated copper plate of 18 mm×18 mm was bonded to the adhesive layer again by thermal compression under the same conditions as above. The press-bonded sandwich was heat treated at 175° C. for one hour for curing the heat resistant resin layer, obtaining an adhesion test specimen. Using an autograph tensile tester (by Shimadzu Mfg. Co., Ltd.), a shear bond strength was measured at a pulling rate of 2.0 mm/min.

Adhesion After Hot Humid Holding

The adhesion test specimen, prepared above, was held at 85° C. and 85% RH for 168 hours before a shear bond strength was measured by means of an autograph tensile tester at a pulling rate of 2.0 mm/min.

TABLE 1

| | Amount (pbw) | Example 1 | 1 | 3 | 4 | 5 | 6 | 7 | 8 | Comparative Example 1 |
|---|---|---|---|---|---|---|---|---|---|---|
| Polyimide resin (solids) | I | 50 | | | | | 50 | 75 | | |
| | II | | 50 | | | | | | | |
| | III | | | 50 | | | | | | |
| | IV | | | | 50 | | | | | |
| | V | | | | | 50 | | | | |
| | VI | | | | | | | | 50 | |
| | VII | | | | | | | | | 50 |
| Epoxy compound | RE310S | 50 | 50 | 50 | 50 | 50 | | | 50 | 50 |
| | RE600NM | | | | | | 50 | 25 | | |
| Catalyst 2PHZ | | 2.5 | 2.5 | 2.5 | 2.5 | 2.5 | 2.5 | 1.25 | 2.5 | 2.5 |
| Adhesive composition/Adhesive film | | I | II | III | IV | V | VI | VII | VIII | IX |
| Properties of cured adhesive film | | | | | | | | | | |
| Young's modulus (MPa) | | 1200 | 1100 | 950 | 900 | 1050 | 1250 | 1000 | 1100 | 1200 |
| Bond strength of encapsulating resin to cured adhesive (MPa) | 1 | 21.8 | 19.5 | 18.7 | 16.4 | 20.2 | 22.4 | 20.1 | 16.3 | 15.2 |
| | 2 | 23.3 | 18.3 | 19.9 | 17.1 | 21.4 | 25.9 | 18.3 | 12.5 | —* |
| | 3 | 25.0 | 18.5 | 19.5 | 15.3 | 22.3 | 21.9 | 18.5 | 11.0 | —* |
| | 4 | 24.3 | 17.6 | 20.5 | 14.5 | 19.7 | 25.0 | 19.1 | —* | —* |
| | 5 | 26.9 | 19.1 | 21.3 | 17.5 | 20.3 | 24.1 | 17.6 | 15.1 | 10.2 |
| | 6 | 25.5 | 20.2 | 18.9 | 15.2 | 22.6 | 22.8 | 20.0 | 17.1 | —* |
| | 7 | 22.6 | 16.4 | 20.3 | 16.3 | 19.8 | 27.8 | 19.5 | 7.3 | —* |
| | 8 | 20.8 | 16.6 | 17.9 | 15.5 | 20.4 | 28.7 | 16.8 | —* | —* |
| | average | 23.8 | 18.3 | 19.6 | 16.0 | 20.8 | 24.8 | 18.7 | 9.9 | 3.2 |
| Bond strength to Ag substrate (MPa) | Initial | 16 | 17 | 15 | 15 | 13 | 21 | 15 | 16 | 16 |
| | After hot humid holding (85° C./85% RH/168 hr) | 14 | 14 | 13 | 14 | 9 | 19 | 12 | 13 | 14 |

*Unmeasureable because the encapsulating resin separated during preparation of a test specimen (molding of encapsulating resin)

Japanese Patent Application No. 2003-327487 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An adhesive composition comprising
    (A) a polyimide resin having phenolic hydroxyl groups on its polymer skeleton and containing a diorganopolysiloxane linkage having vinyl groups as organic substituent groups on the backbone obtained by reacting
    a tetracarboxylic acid dianhydride selected from the group consisting of the following compounds:

wherein $R^1$ is a divalent organic group of 3 to 9 carbon atoms, $R^2$ to $R^6$ each are a substituted or unsubstituted monovalent hydrocarbon group of 1 to 8 carbon atom, exclusive of vinyl, n is 0 or an integer of at least 1, m is an integer of at least 1, and the sum of n+m is an integer of 1 to 100, and a diamine of the formula (2):

wherein $R^7$ is independently hydrogen, a halogen atom or a substituted or unsubstituted monovalent hydrocarbon group of 1 to 8 carbon atoms,

(B) an epoxy resin, and (C) an epoxy resin curing catalyst.

2. An adhesive composition comprising (A) a polyimide resin containing a diorganopolysiloxane linkage having vinyl groups as organic substituent groups on the backbone obtained by reacting a tetracarboxylic acid dianhydride with a diamine compound comprising a diaminopolysiloxane, in which vinyl groups account for at least 5 mol % of the entirety of organic groups bonded to silicon atoms, represented by the formula (1):

wherein $R^1$ is a divalent organic group of 3 to 9 carbon atoms, $R^2$ to $R^6$ each are a substituted or unsubstituted monovalent hydrocarbon group of 1 to 8 carbon atom, exclusive of vinyl, n is 0 or an integer of at least 1, m is an integer of at least 1, and the sum of n+m is an integer of 1 to 100, and with a diamine compound comprising a diaminopolysiloxane, in which vinyl groups account for at least 5 mol % of the entirety of organic groups bonded to silicon atoms, represented by the formula (1):

a diamine of the formula (2):

wherein $R^7$ is independently hydrogen, a halogen atom or a substituted or unsubstituted monovalent hydrocarbon group of 1 to 8 carbon atoms, wherein said polyimide resin (A) has phenolic hydroxyl groups on its polymer skeleton, (B) an epoxy resin, and
(C) an epoxy resin curing catalyst.

3. An adhesive film comprising the adhesive composition of claim 2.

4. The adhesive film of claim 3, comprising a film-forming support selected from the group consisting of polyethylene, polypropylene, polyesters, polyamides, polyimides, polyamide-imides, polyether-imides, polytetrafluoroethylene, paper, and metal foil.

5. The adhesive film of claim 3, wherein the adhesive layer is present in a thickness of from 15 to 50 μm.

6. The adhesive composition of claim 2, wherein epoxy resin (B) is present in an amount of 10 to 100 parts by weight per 100 parts by weight of polyimide resin (A).

7. The adhesive composition of claim 6, wherein epoxy resin curing catalyst (C) is present in an amount of 5 to 50 parts by weight per 100 parts by weight of epoxy resin (B).

* * * * *